United States Patent
Shundo et al.

(10) Patent No.: US 7,527,837 B2
(45) Date of Patent: *May 5, 2009

(54) COMPOSITION CONTAINING A POLYMERIZABLE OPTICALLY ACTIVE COMPOUND

(75) Inventors: Ryushi Shundo, Chiba (JP); Kazuhiko Saigusa, Chiba (JP)

(73) Assignees: Chisso Corporation, Osaka (JP); Chisso Petrochemical Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/605,410

(22) Filed: Nov. 29, 2006

(65) Prior Publication Data
US 2007/0122565 A1 May 31, 2007

(30) Foreign Application Priority Data
Nov. 29, 2005 (JP) ............... 2005-343615
Sep. 14, 2006 (JP) ............... 2006-248945

(51) Int. Cl.
*C09K 19/38* (2006.01)
*C09K 19/34* (2006.01)
*C09K 19/32* (2006.01)
*C09K 19/20* (2006.01)

(52) U.S. Cl. ............... 428/1.3; 428/1.1; 252/299.01; 252/299.61; 252/299.62; 252/299.67

(58) Field of Classification Search ............ 252/299.01, 252/299.5, 299.61, 299.62, 299.66, 299.67; 428/1.1, 1.3
See application file for complete search history.

(56) References Cited

U.S. PATENT DOCUMENTS

| | | | |
|---|---|---|---|
| 5,599,478 | A | 2/1997 | Matumoto et al. |
| 7,070,711 | B2 * | 7/2006 | Seki et al. ............... 252/299.61 |
| 7,413,782 | B2 * | 8/2008 | Kato et al. ............... 428/1.1 |
| 7,425,354 | B2 * | 9/2008 | Yanai et al. ............... 428/1.1 |
| 2004/0151846 | A1 | 8/2004 | Aminaka et al. |
| 2005/0062917 | A1 * | 3/2005 | Kashima ............... 349/120 |
| 2005/0082513 | A1 * | 4/2005 | Seki et al. ............... 252/299.01 |
| 2005/0128391 | A1 * | 6/2005 | Tan et al. ............... 349/117 |
| 2005/0179005 | A1 * | 8/2005 | Kato et al. ............... 252/299.01 |

FOREIGN PATENT DOCUMENTS

| | | |
|---|---|---|
| GB | 2 298 202 | 8/1996 |
| WO | 02/28985 | 4/2002 |

OTHER PUBLICATIONS

Yuzo Hisatake et al., "A Novel Transflective TFT-LCD using Cholesteric Half Reflector", Asia Display IDW '01, LCT8-2, pp. 129-132, 2001.

* cited by examiner

*Primary Examiner*—Shean C Wu
(74) *Attorney, Agent, or Firm*—Wenderoth, Lind & Ponack, L.L.P.

(57) ABSTRACT

The compound provided by the present invention is a polymerizable optically active compound represented by Formula (1):

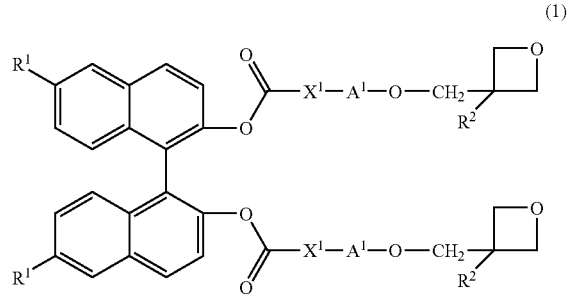

wherein $R^1$ is hydrogen, chlorine or bromine; $R^2$ is hydrogen, methyl or ethyl; $A^1$ is 1,4-phenylene, biphenyl-4,4'-diyl, naphthalene-2,6-diyl or pyridine-2,5-diyl, provided that in the 1,4-phenylene arbitrary hydrogen may be replaced by chlorine, bromine or fluorine, and in the biphenyl-4,4'-diyl arbitrary hydrogen may be replaced by chlorine, bromine or fluorine; and $X^1$ is a single bond, —CH=CH— or —CH$_2$CH$_2$—.

6 Claims, 1 Drawing Sheet

COMPOSITION CONTAINING A POLYMERIZABLE OPTICALLY ACTIVE COMPOUND

FIELD OF THE INVENTION

The present invention relates to a polymerizable optically active compound having a 1,1'-binaphthalene ring and an oxetanyl group, a liquid crystal composition containing the optically active compound, a polymer obtained by polymerizing the optically active compound or the liquid crystal composition, and a use of the polymer. The polymer can be utilized as a film having an optical anisotropy and such products containing the film as a polarizing plate, an optical compensation plate, a luminance improving film, a color filter, a holographic device, a liquid crystal display device, an adhesive, a synthetic polymer having mechanical anisotropy, a cosmetic product, an ornamental product, an anticounterfeit apparatus, a non-linear optical device and an optical memory device.

BACKGROUND OF THE INVENTION

In recent years, a polymerizable liquid crystal compound is used as a film having optical anisotropy. The compound has optical anisotropy in a liquid crystal state, and the alignment of the liquid crystal compound is immobilized through polymerization. The addition of a polymerizable optically active compound to a polymerizable liquid crystal compound induces a helical structure, and various applications as optical devices are available depending on the pitch of the helical structure. That is, the propagation of light along the helical axis is classified depending on the wavelength ($\lambda$) of the target light and the length of the helical pitch (P) into the case (1) where $\lambda<<P$ and the case (2) where $\lambda \approx P$.

In the case where the target $\lambda$ is visible light, the case (1) where $\lambda<<P$ corresponds to 1 ($\mu$m)<P. The application in this case is classified into the case where the Mauguin condition is satisfied and the case where it is not. In the case (A) where the Mauguin condition is satisfied, i.e., the condition where $\Phi<<2\pi\Delta nd/\lambda$ is satisfied, linear polarized light agreeing with or perpendicular to the optical axis on the incident side is emitted as linear polarized light maintained, whereby the device functions as a rotator. Herein, $\Phi$ represents the total twist angle, d represents the thickness, and $\Delta n$ represents the birefringence of the liquid crystal. In the case (B) where the Mauguin condition is not satisfied, the linear polarized light shows birefringence that is determined by $\Phi$, d and $\Delta n$. The rotator can be applied as an optical device for a head-up display and a projector. An application of birefringence of twist alignment includes, for example, optical compensation in an STN (super twisted nematic) type liquid crystal display (as described in JP-A No. 8-87008).

Where the target $\lambda$ is visible light, in the case (2) where $\lambda \approx P$, for example, where the twist direction of the helical structure is right hand, the liquid crystal film selectively reflects only clockwise circularly polarized light having a wavelength $\lambda$ in a range of no$\times$P<$\lambda$<ne$\times$P (where no represents the refractive index of the liquid crystal layer to normal light, and ne represents the refractive index of the liquid crystal layer to abnormal light), and transmits all clockwise circularly polarized light having a wavelength outside the range and anticlockwise circularly polarized light having any wavelength. In other words, clockwise circularly polarized light and anticlockwise circularly polarized light can be selectively separated from each other at a specific wavelength (circularly polarized light dichroic property). From the standpoint of application of an optical device, specifically, it is classified into the case (A) where 350/$n_{ave}$ (nm)<P$\leq$800/$n_{ave}$ (nm), i.e., the wavelength range of the circularly polarized light dichroic property is in the visible region, and the case (B) where P<350/$n_{ave}$ (nm), i.e., the wavelength range of the circularly polarized light dichroic property is in the ultraviolet region (where $n_{ave}$=((ne$^2$+no$^2$)/2)$^{0.5}$).

In the case (A) where 350/$n_{ave}$ (nm)<P$\leq$800/$n_{ave}$ (nm), when unpolarized light is incident, reflected light and transmitted light are colored corresponding to the wavelength causing the circularly polarized light dichroic property. By using the coloration, the device can be applied to a color filter used for design purpose, such as ornament materials, and for a liquid crystal display device. The device can also be applied to anticounterfeit technology since reflected light and transmitted light have unique metallic luster with change in color tone depending on viewing angle, and these optical characteristics cannot be reproduced by a duplicator. Furthermore, the light utilizing efficiency in a liquid crystal display device can be improved by utilizing the circularly polarized light separation function. For example, such a constitution has been proposed that a ¼$\lambda$ plate and an optically anisotropic film exhibiting the circularly polarized light separation function are accumulated on a polarizing plate (as described in Y. Hisatake, et al., Asia Display/IDW '01, LCT8-2). In these purposes, it is demanded to exhibit the circularly polarized light separation function over the entire visible light region (region having a wavelength of from 350 to 750 nm), layers having different pitches may be accumulated, or in alternative, the pitch may be changed consecutively in the thickness direction. The reflection spectrum width $\Delta\lambda$ is larger when the birefringence anisotropy value ($\Delta n$) is large owing to the relational expression $\Delta\lambda=\Delta n \times P$. The reflection spectrum center wavelength $\lambda c$ is calculated from the relational expression $\lambda c=n_{ave}\times P$. When the helical pitch P is set in a range of 700/$n_{ave}$ (nm)<P$\leq$1.5/$n_{ave}$ ($\mu$m), such an application as a reflection filter for an ultraviolet ray or a near infrared ray can be attained by utilizing the similar circularly polarized light separation function.

In the case (B) where P$\leq$350/$n_{ave}$ (nm), the refractive index in the visible range on a plane perpendicular to the helical axis is expressed by ((ne$^2$+no$^2$)/2)$^{0.5}$, and the refractive index in the visible range in the direction of the helical axis is equal to no (as described in W. H. de Jeu, Physical Properties of Liquid Crystalline Materials, Gordon and Breach, New York (1980)).

The optically anisotropic film having the optical characteristics is referred to as a negative C-plate. In a liquid crystal display device that shows black display (dark state) when liquid crystal molecules exhibiting positive birefringence are oriented in the direction perpendicular to the substrate, no birefringence is exhibited in the normal line direction of the display device by alignment of the liquid crystal molecules. In the display device, accordingly, a considerably high contrast can be obtained in the normal line direction. However, birefringence is exhibited in directions deviated from the normal line direction to increase the transmittance in the black display (dark state). In other words, the display device is decrease in contrast in the oblique viewing angle. The negative C-plate can compensate the birefringence caused in directions deviated from the normal line direction of the liquid crystal alignment direction in the display device. As a result, the negative C-plate can be used as an optical compensation plate suitable for improving the viewing angle characteristic in a display device as VA (vertically aligned), TN (twisted nematic), OCB (optically compensated birefringence) and HAN (hybrid aligned nematic).

A compressed polymer film or a film utilizing planarly oriented discotic liquid crystal having a negative birefringence is currently used as an optical compensation film (as described in JP-A No. 2002-6183). The use of a polymer of cholesteric liquid crystal formed of liquid crystal molecules having a positive birefringence enhances the degree of freedom upon designing the refractive index anisotropy value and the wavelength dispersion thereof. The negative C-plate can be used in combination with various optical compensation layers.

The pitch and Δn are appropriately controlled depending on the optical design for the aforementioned purposes.

In any of the aforementioned purposes, the photopolymerizable liquid crystal before curing is demanded to have such characteristics that it has a nematic phase at room temperature and a wide nematic phase, exhibits a good alignment property, and is rapidly cured through UV irradiation. Furthermore, such a photopolymerizable cholesteric liquid crystal composition is demanded that provides a cured product having suitable Δn and transparency, and being excellent in heat resistance and humidity resistance, as characteristics after curing.

Upon optimizing a compound, it is necessary to satisfy the polymerization property and the physical and chemical properties of the polymer, in addition to the aforementioned optical characteristics. The physical and chemical properties include the polymerization rate and the polymerization degree of the compound, and the transparency, the mechanical strength, the coating property, the solubility, the degree of crystallinity, the contraction property, the water permeation property, water adsorption property the gas permeation property, the melting point, the glass transition point, the clearing point, the heat resistance and the chemical resistance of the polymer.

The addition of an optically active compound to a liquid crystal composition induces a helical structure (as described in GB-A No. 2,298,202 and WO No. 02/28985). The pitch (p) depends on the addition amount (concentration c) and the helical twisting power (HTP) of the optically active compound ($p=HTP^{-1} \times c^{-1}$). A liquid crystal composition having a helical structure can be applied to various purposes. Examples of the purposes include a PC (phase change) display device, a guest-host display device, a TN display device, an STN display device, a SSCT (surface stabilized cholesteric texture) display device, a PSCT (polymer stabilized cholesteric texture) display device and a negative C-plate.

In any of the purposes, it is preferred that the addition amount of the optically active compound is minimized to prevent the various properties, such as the viscosity and the liquid crystal property, from being adversely affected. Accordingly, an optically active compound having large HTP is demanded. Furthermore, an optically active compound is generally low in solubility in a liquid crystal composition to make difficult the addition amount thereof large, and therefore, an optically active compound having large HTP is demanded.

A molded article having optical anisotropy is utilized in such applications as an optical compensation plate, such as a polarizing plate a negative C-plate, an alignment film, a color filter, an adhesive, a synthetic polymer having mechanical anisotropy, a cosmetic product, an ornamental product and an anticounterfeit apparatus. Such a molded article is demanded that is excellent in polymerization degree, transparency, mechanical strength, coating property, solubility, degree of crystallinity, contraction property, water permeation property, water absorption property gas permeation property, melting point, glass transition point, clearing point, heat resistance and chemical resistance of the polymer. Furthermore, it is demanded that a liquid crystal compound containing an optically active compound is excellent in polymerization rate.

SUMMARY OF THE INVENTION

A first object of the invention is to provide such a polymerizable liquid crystal compound that has a large HTP, is excellent in solubility with other liquid crystal compounds, and has a 1,1'-binaphthalene ring, and a liquid crystal composition containing the compound. A second object of the invention is to provide such a polymer that is excellent in various characteristics, such as transparency, mechanical strength, coating property, solubility, degree of crystallinity, contraction property, water permeation property, water absorption property, gas permeation property, melting point, glass transition point, clearing point, heat resistance and chemical resistance, and a molded article having optical anisotropy produced with the polymer. A third object of the invention is to provide a product containing the polymer, such as a polarizing plate, an optical compensation plate, an alignment film, a color filter, a holographic device, a liquid crystal display device, an adhesive, a synthetic polymer having mechanical anisotropy, a cosmetic product, an ornamental product, an anticounterfeit apparatus, a non-linear optical device and an optical memory device.

As a result of investigations made by the inventors for attaining the aforementioned objects, it has been found that a liquid crystal compound having a 1,1'-binaphthalene ring according to the invention has a large HTP and is excellent in polymerization property and solubility with other liquid crystal compounds. The inventors have also found that a liquid crystal composition containing the compound of the invention is excellent in coating property, alignment property and polymerization property, and a polymer thereof is excellent as a color filter, a reflective polarizing plate, a phase retardation plate, a luminance improving film, and an optical compensation film, such as a negative C-plate, and thus the invention has been completed. The liquid crystal compound of the invention is expressed by the following item [1].

[1] A polymerizable optically active compound represented by Formula (1):

wherein $R^1$ is hydrogen, chlorine or bromine; $R^2$ is hydrogen, methyl or ethyl; $A^1$ is 1,4-phenylene, biphenyl-4,4'-diyl, naphthalene-2,6-diyl or pyridine-2,5-diyl, and in the 1,4-phenylene and the biphenyl-4,4'-diyl, arbitrary hydrogen may be replaced by chlorine, bromine or fluorine—; and $X^1$ is a single bond, —CH=CH— or —CH$_2$CH$_2$—.

DETAILED DESCRIPTION OF THE INVENTION

The terms used herein are defined as follows. A liquid crystal compound is a generic term for a compound having a liquid crystal phase, such as a nematic phase, a smectic phase, and a compound having no liquid crystal phase but being useful as a component of a liquid crystal composition. A liquid crystal display device is a generic term for a liquid crystal display panel and a liquid crystal display module. A compound represented by Formula (1) may be abbreviated to a compound (1). The abbreviation rule may also be applied to a compound represented by Formula (2) and the like. The term "arbitrary" includes not only an arbitrary position but also an arbitrary number, but a number of zero is excluded.

The invention also includes the following items [2] to [11] in addition to the item [1].

[2] The polymerizable optically active compound described in the item [1], wherein $R^1$ is hydrogen or bromine; $R^2$ is methyl or ethyl; $A^1$ is 1,4-phenylene or biphenyl-4,4'-diyl; and $X^1$ is a single bond, —HC=CH— or —CH$_2$CH$_2$—.

[3] The polymerizable optically active compound described in the item [1], wherein $R^1$ is hydrogen; $R^2$ is ethyl; $A^1$ is 1,4-phenylene; and $X^1$ is a single bond.

[4] The polymerizable optically active compound described in the item [1], wherein $R^1$ is hydrogen; $R^2$ is ethyl; $A^1$ is biphenyl-4,4'-diyl; and $X^1$ is a single bond.

[5] A polymerizable liquid crystal composition containing at least one compound described in any one of items [1] to [4].

[6] A polymerizable liquid crystal composition containing an optically active compound represented by Formula (1) as a first component, a compound represented by Formula (MLC1) as a second component, and a compound represented by Formula (MLC2) as a third component; and a ratio of the first component being from 1 to 15% by weight, a ratio of the second component being from 5 to 45% by weight, and a ratio of the third component being from 45 to 80% by weight, based on a total weight of polymerizable compounds in the composition:

wherein $R^1$ is hydrogen or bromine; $R^2$ is methyl or ethyl; $A^1$ is 1,4-phenylene or biphenyl-4,4'-diyl, and in the 1,4-phenylene, arbitrary hydrogen may be replaced by fluorine or bromine; and $X^1$ is a single bond, —CH=CH— or —CH$_2$CH$_2$—:

wherein in Formula (MLC1), $R^3$ is methyl or ethyl; $A^2$ is 1,4-phenylene, 2-methyl-1,4-phenylene, 9-methylfluorene-2,7-diyl or 9,9-dimethylfluorene-2,7-diyl; and m and n each independently is an integer of from 2 to 10; in Formula (MLC2), $X^2$ is a single bond or —O—; and p and q each independently is an integer of from 0 to 9.

[7] The polymerizable liquid crystal composition described in the item [6], wherein in Formula (MLC1), $R^3$ is ethyl; $A^2$ is 9-methyl fluorene-2,7-diyl; and m and n each independently is an integer of from 4 to 6; in Formula (MLC2), $X^2$ is a single bond; and p and q each independently is an integer of from 0 to 7.

[8] A polymer obtained by polymerizing the polymerizable liquid crystal composition described in any one of the items [5] to [7].

[9] A polymer film having optical anisotropy obtained by polymerizing the polymerizable liquid crystal composition described in any one of the items [5] to [7].

[10] Use of the polymer film having optical anisotropy described in the item [9] as a negative C-plate.

[11] Use of the polymer film having optical anisotropy described in the item [9] as a selective reflection film.

The compound of the invention is represented by Formula (1):

In Formula (1), $R^1$ is hydrogen, chlorine or bromine, and preferably hydrogen or bromine. $R^2$ is hydrogen, methyl or ethyl, and preferably methyl or ethyl. $A^1$ is 1,4-phenylene, biphenyl-4,4'-diyl, naphthalene-2,6-diyl or pyridine-2,5-diyl, and in the 1,4-phenylene and the biphenyl-4,4'-diyl, arbitrary hydrogen may be replaced by chlorine, bromine or fluorine. Preferred examples of $A^1$ include 1,4-phenylene and biphenyl-4,4'-diyl, and in the 1,4-phenylene, arbitrary hydrogen may be replaced by chlorine or bromine. $X^1$ is a single bond, —CH=CH— or —CH$_2$CH$_2$—.

A synthesis scheme of the compound (1) is shown below.

lic acid derivative [d]. (R)-(+)-1,1'-bi-2-naphthol or an optically active 1,1'-bi-2-naphthol derivative [e] and two equivalents of the carboxylic acid derivative [d] are subjected to The symbols used in the scheme have the meanings described above.

3-Alkyl-3-oxetanemethanol [a] is tosylated with p-toluenesulfonic chloride and pyridine to obtain a tosylate [b]. The tosylate [b] and a hydroxycarboxylate ester [c] are subjected to etherification and then hydrolysis to synthesize a carboxyesterification reaction to synthesize Compound (1). A condensation agent, such as dicyclohexylcarbodiimide, is preferably used in the esterification reaction.

Examples of Compound (1) thus synthesized in the aforementioned manner include Compounds (Nf1) to (Nf22) shown below.

-continued (Nf1)

(Nf5)

(Nf2)

(Nf6)

(Nf3)

(Nf7)

(Nf4)

(Nf8)

(Nf9)

(Nf10)

(Nf11)

(Nf12)

(Nf13)

(Nf14)

(Nf15)

(Nf16)

(Nf17)

(Nf18)

(Nf19)

(Nf20)

(Nf21)

(Nf22)

A compound having a 1,1-binaphthalene structure with an oxetanyl group as a polymerizable group is disclosed in JP-A Nos. 2005-263778 and 2005-141206. The compound has such a characteristic feature that the oxetanyl group and the skeleton structure are bonded to each other via a methylene chain. However, the production process of the compound protracted due to introduction of the methylene chain, and therefore, the compound is not suited for mass production. In the production of the compound of the invention, 3-ethyl-3-hydroxymethyl-oxetane (OXT-101, a trade name, produced by Toagosei Co., Ltd.) or 3-methyl-3-hydroxymethyl-oxetane is tosylated to form an ether bond directly on the skeleton structure, and thus the compound of the invention has a simple structure as compared to the compounds having been disclosed and is suited for mass production. The compound of the invention has sufficient capability as a chiral agent while it has a simple structure, and is suitable as a material for mass production of a negative C-plate and a selective reflection film.

The other compounds used in the invention can be synthesized by appropriately combining the synthesis methods of organic chemistry disclosed in Houben Wyle, Methoden der Organischen Chemie, Georg Thieme Verlag, Stuttgart, Organic Syntheses, John Wiley & Sons, Inc., Organic Reactions, John Wiley & Sons, Inc., Comprehensive Organic Synthesis, Pergamon Press, and New Experimental Chemistry Course (Shin Jikken Kagaku Kouza), Maruzen, Inc.

The polymerizable liquid crystal composition of the invention will be described. The first component of the composition is Compound (1), and the ratio of the first component is from 1 to 15% by weight based on the total weight of polymerizable compounds in the composition.

(1)

wherein $R^1$ is hydrogen or bromine; $R^2$ is methyl or ethyl; $A^1$ is 1,4-phenylene or biphenyl-4,4'-diyl, and in the 1,4-phenylene, arbitrary hydrogen may be replaced by fluorine or bromine; and $X^1$ is a single bond, —CH=CH— or —CH$_2$CH$_2$—.

The second component of the polymerizable liquid crystal composition of the invention is Compound (MLC1), and the ratio of the second component is from 5 to 45% by weight based on the total weight of polymerizable compounds in the composition.

(MLC1)

wherein $R^3$ is methyl or ethyl; $A^2$ is 1,4-phenylene, 2-methyl-1,4-phenylene, 9-methylfluorene-2,7-diyl or 9,9-dimethylfluorene-2,7-diyl; and m and n each independently is an integer of from 2 to 10.

The third component of the polymerizable liquid crystal composition of the invention is Compound (MLC2), and the ratio of the third component is from 45 to 80% by weight based on the total weight of polymerizable compounds in the composition.

The polymerizable liquid crystal composition of the invention has, for example, the following features. (1) The composition exhibits a liquid crystal state but is not crystallized around room temperature. (2) The composition shows selective reflection to the visible range or lower by adding Compound (1) in an amount of 15% or less based on the total weight of the composition owing to the large helical twisting power (HTP) of Compound (1). (3) The composition can be rapidly cured through irradiation of an electron beam or an

(MLC2)

wherein $X^2$ is a single bond or —O—; and p and q each independently is an integer of from 0 to 9.

In a preferred example of the polymerizable liquid crystal composition, Compound (1), in which $R^1$ is hydrogen or bromine, $R^2$ is methyl or ethyl, $A^1$ is 1,4-phenylene (in which arbitrary hydrogen may be replaced by fluorine or bromine) or biphenyl-4,4'-diyl, and $X^1$ is a single bond, —CH=CH— or —CH$_2$CH$_2$—, is used as the first component; Compound (MLC1), in which $R^3$ is ethyl, $A^2$ is 9-methylfluorene-2,7-diyl, and m is an integer of from 4 to 6, is used as the second component; Compound (MLC2), in which $X^2$ is a single bond, and p and q each independently is an integer of from 0 to 7, is used as the third component; and the ratio of the first component is from 1 to 15% by weight, the ratio of the second component is from 5 to 45% by weight, and the ratio of the third component is from 45 to 80% by weight, based on the total weight of polymerizable compounds in the composition.

ultraviolet ray by adding a photopolymerization initiator. (4) The composition is excellent in alignment property.

Preferred examples of Compound (MLC1) used in the polymerizable liquid crystal composition of the invention include Compounds (MLC1-1) to (MLC1-10) shown below. Compound (MLC1) is a liquid crystal dioxetanyl compound. The compound has a liquid crystal phase in a wide temperature range and has a high NI point (clearing point), and thus the compound is used for controlling the NI point in the liquid crystal temperature range of the composition. The compound is also used for increasing the viscosity of the composition owing to the large viscosity of the compound. Compound (MLC1) has two oxetanyl groups in the molecule, and thus can form a high density three-dimensional network structure through polymerization, whereby a film having heat resistance can be produced.

(MLC1-4)

(MLC1-5)

(MLC1-6)

(MLC1-7)

(MLC1-8)

(MLC1-9)

(MLC1-10)

Compounds (MLC1-1) to (MLC1-3) can be synthesized by the methods disclosed in JP-A No. 2005-60373. Synthesis methods of Compounds (MLC1-5) to (MLC1-10) are disclosed in Liquid Crystals, vol. 31, No. 12, pp. 1627-1637 (2004).

Preferred examples of Compound (MLC2) used in the polymerizable liquid crystal composition of the invention include Compounds (MLC2-1) to (MLC2-6) shown below. Compound (MLC2) is a liquid crystal dioxiranyl compound. The compound has a liquid crystal phase. The compound has a function of decreasing a melting point owing to the low melting point of the compound. The compound is expected to have an effect of accelerating polymerization reaction since the compound has an oxiranyl group.

(MLC2-1)

(MLC2-2)

(MLC2-3)

(MLC2-4)

(MLC2-5)

(MLC2-6)

Synthesis methods of Compounds (MLC2-1) to (MLC2-6) are disclosed in Macromolecules, vol. 26, pp. 1244-1247 (1993) and Macromol. Chem. Phys., vol. 202, pp. 180-187 (2001).

The polymerizable liquid crystal composition of the invention may further contain additives depending on necessity. Examples of an additive for controlling the properties of the polymer include a non-liquid crystalline polymerizable compound, a surfactant, an antioxidant and an ultraviolet ray absorbent. Examples of an additive for polymerizing the polymerizable liquid crystal composition of the invention include a polymerization initiator. In addition to these, an organic solvent may be used for diluting the composition. The amounts of the additives are preferably small as far as the intended effects thereof are attained. Atoms constituting the components of the composition may preferably contain isotopes thereof since they have the similar nature.

A non-liquid crystal polymerizable compound may be added to the composition for controlling the film forming property and the mechanical strength. Preferred examples of the non-liquid crystalline polymerizable compound include a vinyl ether compound and an oxetane compound.

Examples of the non-liquid crystalline polymerizable compound include a polymerizable compound suitable for cationic polymerization. Examples of the compound include ethyl vinyl ether, hydroxybutyl monovinyl ether, t-amyl vinyl ether, cyclohexanedimethanolmethyl vinyl ether, 3-ethyl-3-hydroxymethyloxetane, 3-methyl-3-hydroxymethyloxetane, di(3-ethyloxeta-3-ylmethyl) and 3-ethyl-3-(2-ethylhexyloxymetyl)oxetane. These compounds are suitable for controlling the viscosity of the composition.

Examples of the surfactant include a quaternary ammonium salt, an alkylamine oxide, a polyamine derivative, a polyoxyethylene-polyoxypropylene condensate, polyethylene glycol and an ester thereof, sodium lauryl sulfate, ammonium lauryl sulfate, an amine lauryl sulfate, an alkyl-replaced aromatic sulfonate salt, an alkyl phosphate salt, a perfluoroalkyl sulfonate salt, a perfluoroalkyl carboxylate salt, a perfluoroalkyl ethylene oxide adduct and a perfluoroalkyl trimethylammonium salt. The surfactant has such an effect as facilitating the coating operation of the composition on a support substrate. The preferred ratio of the surfactant varies depending on the kind of the surfactant and the formulation of the composition, and is from 100 ppm to 5% by weight, and more preferably from 0.1 to 1% by weight, based on the total weight of the polymerizable compounds.

Examples of the antioxidant include hydroquinone, 2,6-di-t-butyl-p-cresol, 2,6-di-t-butylphenol, triphenyl phosphite and trialkyl phosphite. Preferred examples of commercially available products thereof include IRGANOX 245 and IRGANOX 1035, produced by Ciba Specialty Chemicals, Inc.

Examples of the ultraviolet ray absorbent include TINUVIN PS, TINUVIN 292, TINUVIN 109, TINUVIN 328, TINUVIN 384-2, TINUVIN 123, TINUVIN 400 and TINUVIN 400L, produced by Ciba Specialty Chemicals, Inc.

Examples of the solvent include benzene, toluene, xylene, mesitylene, butylbenzene, diethylbenzene, tetralin, methoxybenzene, 1,2-dimethoxybenzene, ethylene glycol dimethyl ether, diethylene glycol dimethyl ether, acetone, methyl ethyl ketone, methyl isobutyl ketone, cyclopentanone, cyclohexanone, ethyl acetate, ethyl lactate, methyl lactate, ethylene glycol monomethyl ether acetate, propylene glycol monomethyl ether acetate, propylene glycol monoethyl ether acetate, γ-butyrolactone, 2-pyrrolidone, N-methyl-2-pyrrolidone, dimethylformamide, chloroform, dichloromethane, carbon tetrachloride, dichloroethane, teterachloroethylene, trichloroethylene, chlorobenzene, t-butyl alcohol, diacetone alcohol, glycerin, monoacetin, ethylene glycol, triethylene glycol, hexylene glycol, ethylene glycol monomethyl ether, ethyl cellosolve, butyl cellosolve, ethanol, isopropanol and 3-methoxybutyl acetate. The solvent may be used solely or a mixture thereof.

The polymerization condition of the composition of the invention will be described. The composition contains a polymerizable compound. A polymer is obtained by polymerizing the composition. The reaction is cationic polymerization. In order to obtain a polymer excellent in alignment, polymerization is preferably effected by using a photopolymerization initiator since the composition can be easily polymerized under the condition where the composition is in a liquid crystalline state. In order to accelerate the polymerization, a thermal polymerization initiator may be used in combination with a photopolymerization initiator.

Examples of the cationic photopolymerization initiator include a diallyl iodonium salt and a triallyl sulfonium salt.

The cationic photopolymerization initiator may be a general-purpose product. Examples of a commercially available product of the cationic photopolymerization initiator include DST-102, produced by Midori Kagaku Co., Ltd., Cyracure UVI-6990, Cyracure UVI-6974 and Cyracure UVI-6992, produced by Union Carbide Corp., Adeka Optomer SP-150, SP-152, SP-170 and SP-172, produced by Adeka Corp., Photoinitiator 2074, produced by Rhodia, Inc., Irgacure 250, produced by Ciba Specialty Chemicals, Inc., and UV-9380C, produced by GE Silicones.

A cationic thermal polymerization initiator may be used with the cationic photopolymerization initiator. The addition of a cationic thermal polymerization initiator accelerates polymerization through post-baking. Examples of the cationic thermal polymerization initiator include San-aid SI-60L, SI-80L, SI-100L, SI-110 and SI-180, produced by Sanshin Chemical Industry Co., Ltd.

Preferred examples of light used for photopolymerization include an ultraviolet ray, visible light and an infrared ray. An electron beam and an electromagnetic ray, such as an X-ray, may also be used. The wavelength of light is selected in accordance with the absorption wavelength of the photopolymerization initiator used. In general, an ultraviolet ray and visible light are preferably used. The wavelength range is preferably from 150 to 500 nm, more preferably from 250 to 450 nm, and most preferably from 300 to 400 nm. Examples of the light source include a low pressure mercury lamp (such as a bactericidal lamp, a fluorescent chemical lamp and a black-light lamp), a high pressure discharge lamp (such as a high pressure mercury lamp and a metal halide lamp), and a short arc discharge lamp (such as a superhigh pressure mercury lamp, a xenon lamp and a mercury xenon lamp). Among these, a superhigh pressure mercury lamp is preferred as the light source. The composition may be irradiated with light emitted from the light source as it is, and may be irradiated with light having a particular wavelength (or a particular wavelength range) selected by using a filter. The irradiation energy density is preferably from 2 to 5,000 mJ/cm$^2$, more preferably from 10 to 3,000 mJ/cm$^2$, and particularly preferably from 100 to 2,000 mJ/cm$^2$. The illuminance is preferably from 0.1 to 5,000 mW/cm$^2$, and more preferably from 1 to 2,000 mW/cm$^2$. The temperature upon irradiation is set in such a manner that the composition has a liquid crystal phase. The irradiation temperature is preferably 100° C. or less. A temperature exceeding 100° C. may cause polymerization with heat to fail to obtain favorable alignment in some cases.

Examples of the shape of the polymer include a film and a plate. The polymer may be molded. In order to obtain a film of the polymer, a support substrate is generally employed. The composition is coated on a support substrate, and a paint film having a liquid crystal phase is polymerized to obtain the film. The preferred thickness of the polymer depends on the optical anisotropy value and the purpose of the polymer. Accordingly, the range of the thickness cannot be strictly determined and is preferably from 0.05 to 50 μm, more preferably from 0.1 to 20 μm, and particularly preferably from 0.5 to 10 μm. The haze value of the polymer is generally 1.5% or less. The transmittance of the polymer is generally 80% or more in the visible region. The polymer is suitable for an optically anisotropic thin film used in a liquid crystal display device.

Examples of the support substrate include triacetyl cellulose, polyvinyl alcohol, polyimide, polyester, polyarylate, polyether imide, polyethylene terephthalate and polyethylene naphthalate. Examples of commercially available products thereof include Arton, produced by JSR Corp., Zeonex and Zeonoa, produced by Zeon Corp., APEL, produced by Mitsui Chemicals, Inc., and TOPAS, produced by Ticona. Examples of the support substrate include a monoaxially stretched film and a biaxially stretched film. Preferred examples of the support substrate include a triacetyl cellulose film. A triacetyl cellulose film may be used as it is without a pretreatment, or may be used after subjecting to a saponification treatment. Zeonex, APEL and TOPAS may be subjected to a surface treatment, such as a corona discharge treatment and an UV-ozone treatment. Other examples of the support substrate include a metallic support substrate, such as aluminum, iron and copper, and a glass support substrate, such as alkali glass, borosilicate glass and flint glass.

The paint film on the support substrate may be prepared by coating the composition as it is. The paint film may be prepared by coating the composition having been dissolved in a suitable solvent, and then removing the solvent. Examples of the coating method include a spin coating method, a roll coating method, a curtain coating method, a flow coating method, a printing method, a microgravure coating method, a gravure coating method, a wire bar coating method, a dip coating method, a spray coating method and a meniscus coating method.

The factors determining alignment of liquid crystal molecules in the polymerizable liquid crystal composition include (1) the kind of compounds contained in the composition, (2) the kind of the support substrate and (3) the method of aligning treatment. Accordingly, the alignment depends on the kinds of Compound (1), Compound (MLC1) and Compound (MLC2) and also depends on the material of the support substrate, such as a polymer, glass or a metal. The alignment further depends on the method of aligning treatment, such as rubbing in one direction with rayon cloth or the like, oblique vapor deposition of silicon oxide, and etching in a slit form. In the rubbing treatment, the support substrate may be directly rubbed. The support substrate may be coated with a thin film of polyimide, polyvinyl alcohol or the like, and the thin film may be rubbed. Such a thin film is also known that provides favorable alignment without rubbing treatment. In alternative, a liquid crystal polymer may be coated on the support substrate.

The polymer of the invention will be described. The polymer is obtained from a composition containing Compound (1), Compound (MLC1) and Compound (MLC2) as constitutional components. The polymer has plural characteristics among such characteristics as being colorless and transparent, having a small photoelasticity, being hard to separate from the support substrate, having sufficient hardness, having large heat resistance, and having large weather resistance. The polymer is also excellent in such characteristics as impact resistance, workability, electric characteristics and solvent resistance. The important characteristics upon preparing a film of the polymer include such characteristics as being hard to separate from the support substrate, having sufficient hardness, and having large heat resistance.

The thickness (d) of the polymer can be controlled in the following manner. In the method of coating the composition having been diluted with a solvent on the support substrate, the concentration of the composition, the method of coating, and the conditions on coating may be appropriately selected to obtain a paint film having an intended thickness. A method using a liquid crystal cell is also preferred. A liquid crystal cell is favorably used since it has an alignment film, such as polyimide. Upon charging the composition in a liquid crystal cell, the thickness of the paint film can be controlled by the distance of the liquid crystal cell.

The use of the polymer is as follows. The polymer can be used as a film having optical anisotropy. Examples of the use of the polymer include an optical film, such as a selective reflection film and a viewing angle compensation film, a color filter, a reflective polarizing plate, a phase retardation plate, a luminance improving film and a negative C-plate. The polymer may also be used as a cosmetic product, an ornamental product, a non-linear optical material and an information memory material.

The invention will be described with reference to examples after describing the measurement methods of characteristics. The examples shown below are intended only to illustrate the invention, and thus the invention is not limited to the examples.

[Cellophane Adhesive Tape Peeling Test]

The adhesive tape peeling test was carried out according to JIS K5400, 8.5 Adhesiveness, 8.5.2 Crosscut Tape Test. That is, the adhesiveness was evaluated by the number of squares that were not peeled among 100 squares.

[Pencil Hardness]

The pencil hardness was measured according to JIS K5400, 8.4 Pencil Scratch Test. The results are shown in terms of hardness of pencils.

[Heat Resistance Test]

The heat resistance test was carried out under conditions of 100° C. for 500 hours, and the result was evaluated by change of retardation. Polyamic acid (PIA5310, produced by Chisso Corp.) was coated on a glass substrate, which was then heated at 210° C. for 30 minutes to obtain a support substrate. The surface of polyimide thus formed was rubbed with rayon cloth. A composition as a specimen was diluted with a mixed solvent of toluene and cyclopentanone (2/1 by weight) to prepare a solution having a concentration of 30% by weight. The solution was coated on the support substrate with a spin coater, and after heating at 70° C. for 3 minutes, the resulting paint film was irradiated with an ultraviolet ray at 60° C. for 10 seconds by using a superhigh pressure mercury lamp (250 W/cm). The resulting polymer film was measured for retardation at 25° C. The polymer was heated to 100° C. for 500 hours, and then again measured for retardation at 25° C. The resulting two values were compared to evaluate the heat resistance. The retardation was measured according to the method disclosed in a known literature (H. Awaya, Kobunshi Sozai no Henko Kenbikyo Nyumon (Introduction to Polarizing Microscope for Polymer Materials), p. 94, published by Agne Gijutsu Center Co., Ltd. (2001)) and by using a Senarmont compensator. The wavelength used was 550 nm.

[Optical Anisotropy ($\Delta n$)]

The optical anisotropy ($\Delta n$) was calculated in the following manner. The value of retardation (25° C.) of the polymer was measured according to the method for the heat resistance test. The thickness of the polymer (d) was also measured. The retardation is the product of $\Delta n$ and d ($\Delta n \times d$). Accordingly, the value of optical anisotropy was calculated from the relationship.

[Alignment of Liquid Crystal Molecules]

The polymer film (liquid crystal alignment film) was prepared on a TAC film having been subjected to a saponification treatment. The alignment of the polymer is determined through analysis with an ellipsometer based on the angle dependency of the intensity of transmitted light.

[Measurement with Ellipsometer]

An ellipsometer, OPTIPRO, produced by Shintech, Inc., was used. The polymer film was irradiated with light having a wavelength of 550 nm. The incident angle of the light was decreased from 90° with respect to the film surface to measure the retardation ($\Delta n \times d$).

[Measurement of HTP]

The compound of the invention was dissolved in an amount of 1% by weight in a nematic liquid crystal composition, ZLI-1132, produced by Merck & Co., Inc., to prepare a composition, and HTP was calculated by using Canot's wedge method.

EXAMPLE 1

<Synthesis of Compound (Nf1)>

(First Step)

116 g of 3-ethyl-3-hydroxymethyloxetane (OXT-101, a trade name, produced by Toagosei Co., Ltd.) was added to 500 mL of pyridine, and cooled to 0° C. under stirring. 190 g of p-toluenesulfonyl chloride was added thereto in several batches. After stirring for 5 hours at 0° C. maintained, the reaction solution was put in 1 L of ice water. The solution was extracted with 500 mL(milliliter) of diethyl ether, and the diethyl ether layer was washed with 3% hydrochloric acid until the pH exhibited acidity, and further washed with a saturated sodium carbonate solution and water in sequence, followed by drying over anhydrous magnesium sulfate. The solvent was distilled off to obtain 243 g of 3-((tosyloxy)methyl)-3-ethyloxetane.

(Second Step)

50 g of ethyl hydroxybenzoate and 21 g of potassium hydroxide were added to 400 mL of dimethylformamide, and stirred at 70° C. for 1 hour. After decreasing the temperature to 45° C., 100 g of 3-((tosyloxy)methyl)-3-ethyloxetane was added dropwise thereto, and then stirred at 45° C. for 3 hours. Water and toluene were added thereto, and the toluene layer was separated. The toluene layer was washed with 3% hydrochloric acid, a saturated sodium carbonate solution and water, and then toluene was distilled off. 50 g of sodium hydroxide, 500 mL of ethanol and 200 mL of water were added to the resulting residue, and refluxed for 2 hours. A residue obtained by distilling ethanol off was put in 500 mL of 5% hydrochloric acid to obtain crystals. The crystals thus obtained by filtering were recrystallized from a mixed solvent of ethanol and water to obtain 60 g of 4-(3-ethyloxetane-3-ylmethoxy)benzoic acid (OX1), which had a melting point of 127.5° C.

(OX1)

(Third Step)

6.8 g of (R)-(+)-1,1'-bi-2-naphthol, 4.9 g of 4-(3-ethyloxetane-3-ylmethoxy)benzoic acid (OX1) and 0.1 g of dimethylaminopyridine were added to 100 mL of methylene chloride to obtain a solution, to which 5.2 g of dichlorohexylcarbodiimide was then added, followed by stirring at room temperature for 12 hours. 50 mL of water was added thereto, and the resulting organic layer was dried over anhydrous magnesium sulfate. A residue obtained by distilling the solvent off was purified by silica gel chromatography to obtain 5 g of Compound (Nf1), which had a melting point of 215 to 217° C.

(Nf1)

EXAMPLE 2

<Synthesis of Compound (Nf11)>

(First Step)

12 g of ethyl hydroxybiphenylcarboxylate and 15 g of potassium hydroxide were added to 100 mL of ethanol, and stirred at 60° C. for 1 hour. After decreasing the temperature to 45° C., 15 g of 3-((tosyloxy)methyl)-3-ethyloxetane was added dropwise thereto, and then refluxed for 2 hours. Water and toluene were added thereto, and the toluene layer was separated. The toluene layer was washed with 3% hydrochloric acid, a saturated sodium carbonate solution and water, and then toluene was distilled off. 20 g of sodium hydroxide, 500 mL of ethanol and 100 mL of water were added to the resulting residue, and refluxed for 2 hours. A residue obtained by distilling ethanol off was put in 300 mL of 5% hydrochloric acid to obtain crystals. The crystals thus obtained by filtering were recrystallized from ethanol to obtain 8 g of 4-(3-ethy-loxetane-3-ylmethoxy)biphenylcarboxylic acid (OX2), which had a melting point of 222 to 225° C.

(OX2)

(Second Step)

3.2 g of (R)-(+)-1,1'-bi-2-naphthol, 7.6 g of 4-(3-ethyloxetane-3-ylmethoxy)biphenylcarboxylic acid (OX2) and 0.1 g of dimethylaminopyridine were added to 100 mL of methylene chloride to obtain a solution, to which 5.2 g of dichlorohexylcarbodiimide was then added, followed by stirring at room temperature for 12 hours. 50 mL of water was added thereto, and the resulting organic layer was dried over anhydrous magnesium sulfate. A residue obtained by distilling the solvent off was purified by silica gel chromatography to obtain 8.7 g of Compound (Nf11), which had HTP ($\mu m^{-1}$) of 46.

(Nf11)

Comparative Example 1

A commercially available chiral agent, CB-15, was measured for HTP. The HTP of the compound was 5 $\mu m^{-1}$.

CB-15

It is understood from comparison between CB-15 and Compound (Nf11) in HTP that the HTP of Compound (Nf11) is larger than that of CB-15 in 9 times or more.

EXAMPLE 3

<Preparation of Composition (PLC-1)>

Composition (MIX1) was prepared, which contained 13% by weight of Compound (Nf1), 42% by weight of Compound (MLC1-2) and 45% by weight of Compound (MLC2-1). Compound (Nf1) exhibited good compatibility without phase separation. Composition (MIX1) exhibited a cholesteric liquid crystal phase, and was not immediately crystallized at room temperature.

(Nf1)

13 wt %

(MLC1-2)

42 wt %

(MLC2-1)

45 wt %

A polymerization initiator was added to Composition (MIX1) in an amount of 3% by weight based on the total amount of the composition, and then cyclopentaneone was added thereto to prepare a solution having a content of the polymerizable liquid crystal compounds of 25% by weight. The solution was designated as Composition (PLC-1).

EXAMPLE 4

<Production of Negative C-Plate (F1)>

Figure 1:
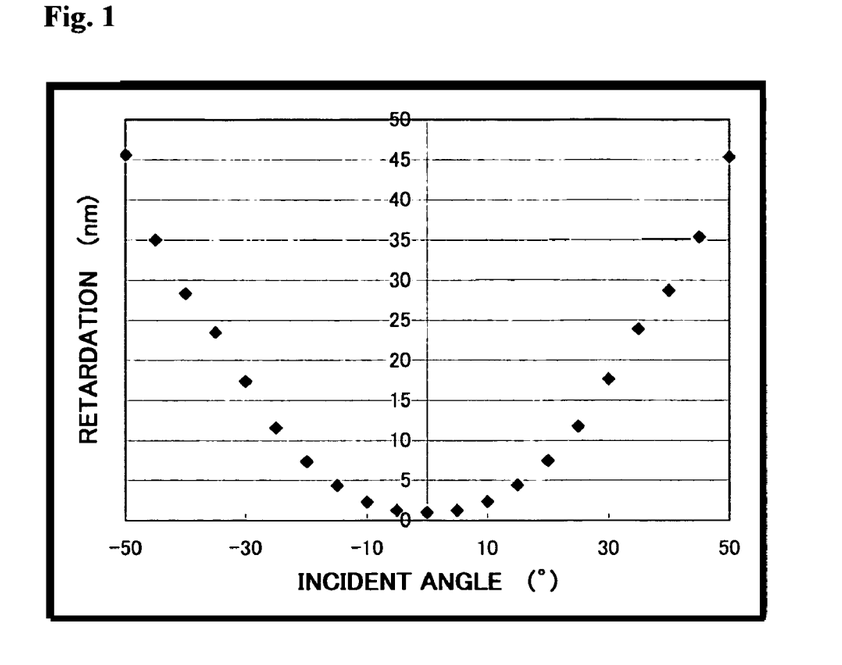
FIG. 1 is a graph showing the incident angle dependency of the retardation of the film (F1).
Figure 2:
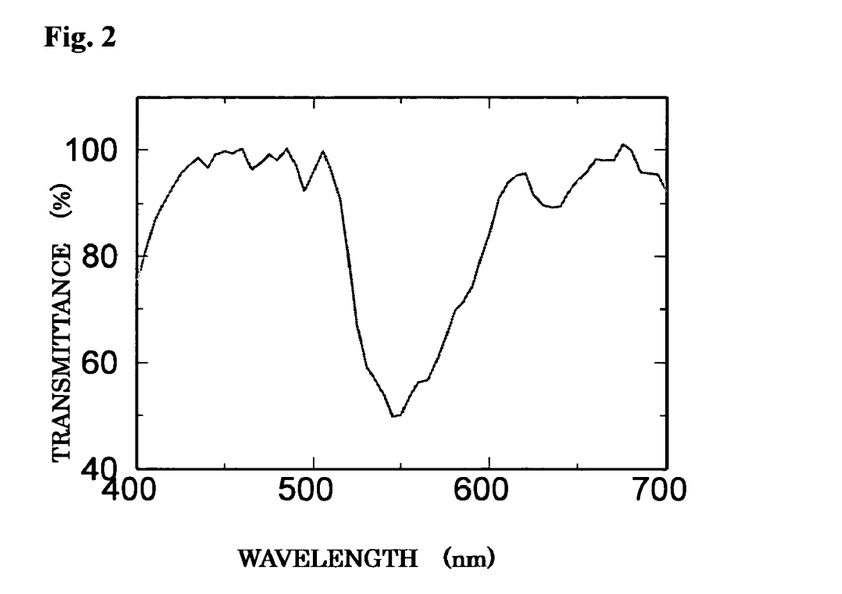
FIG. 2 is a chart showing the visible light transmittance of the film (F3).

A triacetyl cellulose (TAC) film having been subjected to a saponification treatment was used as a support substrate. The surface of the film was rubbed with rayon cloth. Composition (PLC-1) described in Example 3 was coated on the TAC film by using a spin coater. After coating, the film was heat-treated in an oven set at 70° C. for 5 minutes, whereby the solvent was removed, and the liquid crystal layer was oriented. The paint film thus obtained was irradiated with an ultraviolet ray (30 mW/cm$^2$, 365 nm) by using a superhigh pressure mercury lamp (250 W) at 25° C. for 30 seconds to obtain a tack-free polymer film (F1). Measurement results of Film (F1) with an ellipsometer are shown in FIG. 1. It is understood from the measurement results that the film is a negative C-plate. Film (F1) had a surface hardness of HB in terms of pencil hardness. In the cellophane adhesive tape peeling test, no peeling was observed, but all the squares remained. The retardation was not changed after a heat resistance test at 100° C. for 500 hours. Accordingly, the liquid crystal oriented film (F1) was hard to separate from the support substrate and had optical anisotropy and sufficient hardness.

EXAMPLE 5

<Preparation of Composition (PLC-2)>

Composition (MIX2) was prepared, which contained 10% by weight of Compound (Nf11), 10% by weight of Compound (MLC1-2) and 80% by weight of Compound (MLC2-1). Compound (Nf11) exhibited good compatibility without phase separation. Composition (MIX2) exhibited a cholesteric liquid crystal phase, and was not immediately crystallized at room temperature.

(NF11)

10 wt %

(MLC1-2)

10 wt %

(MLC2-1)

80 wt %

(Nf11)

6 wt %

(MLC1-2)

47 wt %

(MLC2-1)

47 wt %

What is claimed is:

1. A polymerizable liquid crystal composition comprising an optically active compound represented by Formula (1) as a first component, a compound represented by Formula (MLC1) as a second component, and a compound represented by Formula (MLC2) as a third component; and a ratio of the first component being from 1 to 15% by weight, a ratio of the second component being from 5 to 45% by weight, and a ratio of the third component being from 45 to 80% by weight, based on a total weight of polymerizable compounds in the composition:

(1)

wherein $R^1$ is hydrogen or bromine; $R^2$ is methyl or ethyl; $A^1$ is 1,4-phenylene or biphenyl-4,4'-diyl, and in the 1,4-phenylene, arbitrary hydrogen may be replaced by fluorine or bromine; and $X^1$ is a single bond, —CH=CH— or —CH$_2$CH$_2$—:

(MLC1)

(MLC2)

wherein in Formula (MLC1), $R^3$ is methyl or ethyl; $A^2$ is 1,4-phenylene, 2-methyl-1,4-phenylene, 9-methylfluorene-2,7-diyl or 9,9-dimethylfluorene-2,7-diyl; and m and n each independently is an integer of from 2 to 10; in Formula (MLC2), $X^2$ is a single bond or —O—; and p and q each independently is an integer of from 0 to 9.

2. The polymerizable liquid crystal composition according to claim 1, wherein in Formula (MLC1), $R^3$ is ethyl; $A^2$ is 9-methylfluorene-2,7-diyl; and m and n each independently is an integer of from 4 to 6; in Formula (MLC2), $X^2$ is a single bond; and p and q each independently is an integer of from 0 to 7.

3. A polymer obtained by polymerizing the polymerizable liquid crystal composition according to claim 1.

4. A polymer film having optical anisotropy obtained by polymerizing the polymerizable liquid crystal composition according to claim 1.

5. An apparatus comprising the polymer film having optical anisotropy according to claim 4 as a negative C-plate.

6. An apparatus comprising the polymer film having optical anisotropy according to claim 4 as a selective reflection film.

* * * * *